Patented May 24, 1927.

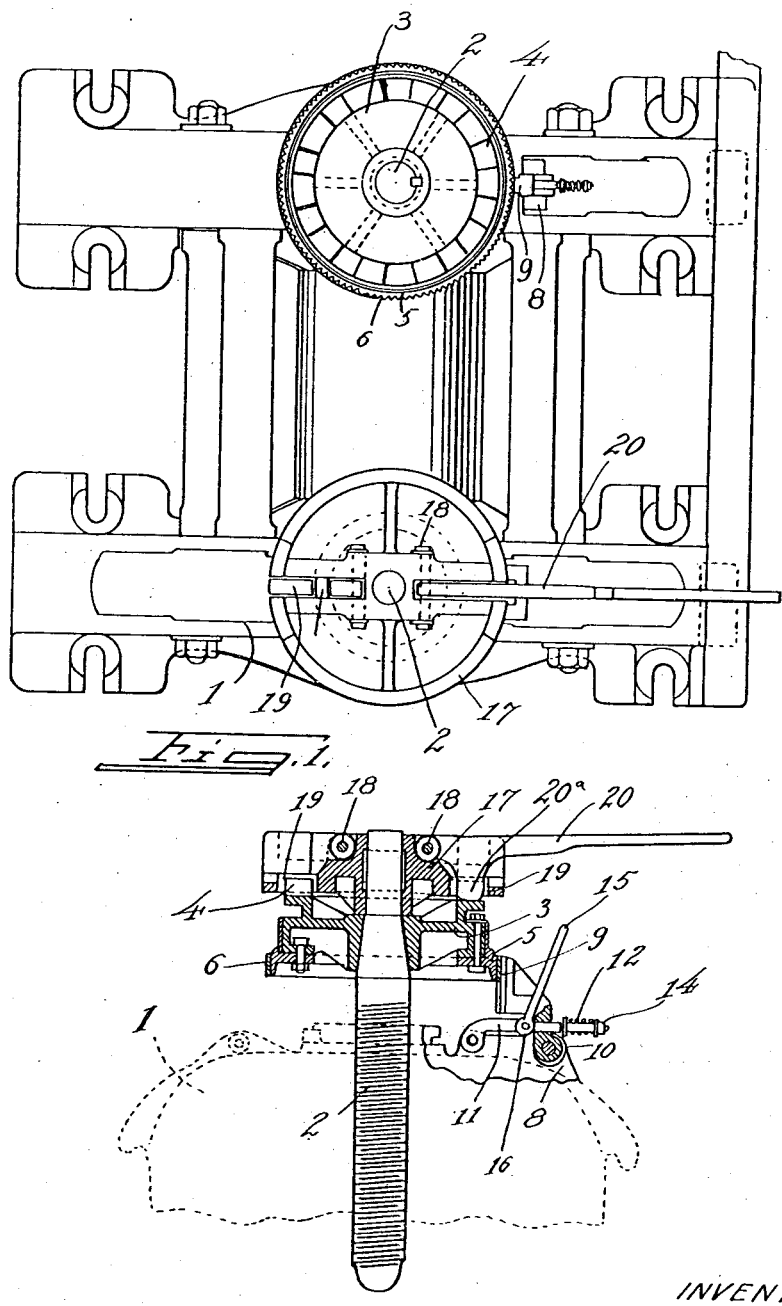

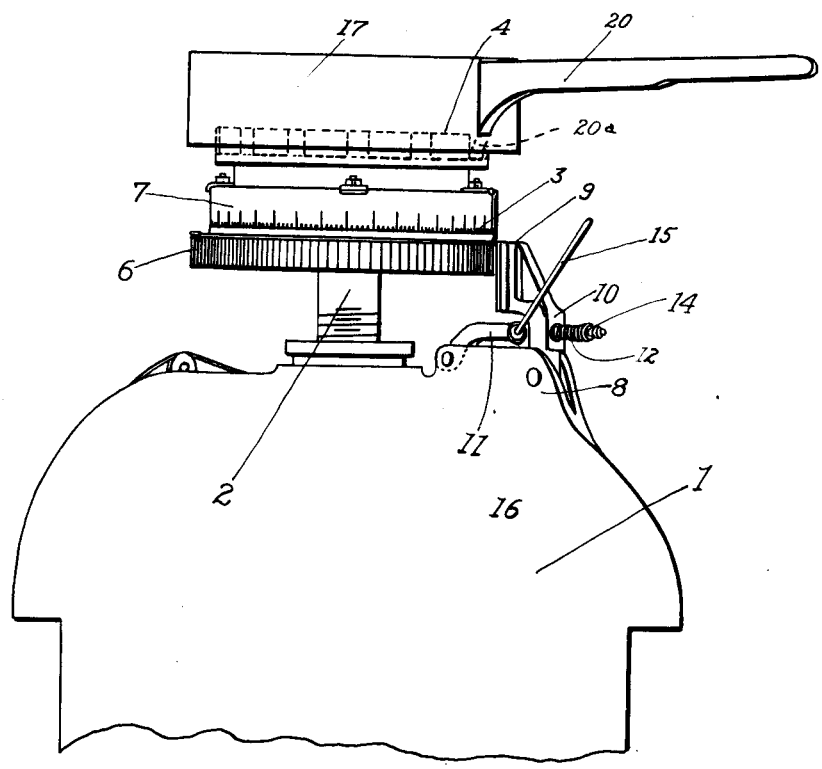
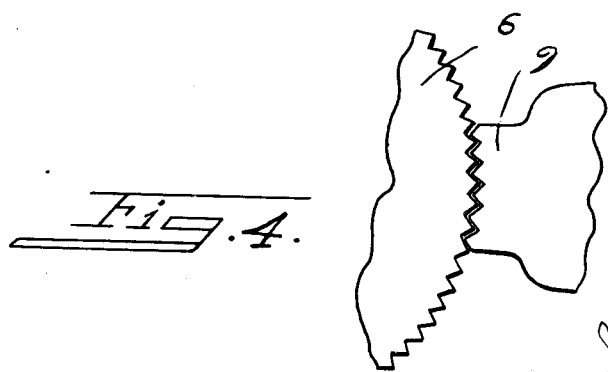

UNITED STATES PATENT OFFICE.

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO.

ROLLING-MILL SCREW-DOWN.

Application filed April 11, 1925. Serial No. 22,273.

My invention relates to devices for applying the screws to the rolls of metal rolling mills.

In metal rolling, it is the practice to provide for adjustment of the relative position of the rolls through which a piece is passed, for purposes of reduction of its thickness, or otherwise, by means of forcing the journals of one of the rolls toward the other roll, by means of heavy screws, held in the housings, and abutting against the roll journals. The screws and devices for operating them are known as "screw downs".

In making fine adjustments of rolls to provide for the exact nature of "bite" on a piece of metal to be reduced, it is advantageous to apply considerable force thereto in small amounts, so as to make what might be termed micrometer adjustments.

It is the object of my invention to provide for such a screw down, and particularly to provide a device in which a hammer-like blow can be applied by the operating lever, to the screw head, which head is held in place by a multiple tooth dog, which by means of the blow is dislodged for the space of as little as one tooth at a time.

I accomplish my objects by that certain construction and arrangement of parts to be hereinafter more specifically pointed out and claimed.

In the drawings:

Figure 1 is a plan view of a rolling mill, showing the lever supporting head removed at one side.

Figure 2 is a central vertical section through the screw and operating device thereof.

Figure 3 is a perspective view of the operating parts for the screw.

Figure 4 is a diagram showing the teeth of the screw head, and the multiple toothed dog.

I have indicated a rolling mill housing at 1, and the roll adjusting screw at 2. Mounted on the upper end of the screw is a circular head 3, having a series of widely interspaced large teeth 4, on its upper surface. Bolted to the lower surface is a vertically toothed ratchet-like wheel 5, the teeth being indicated at 6 (see diagram of Figure 4). The lateral face of the screw head may be calibrated, as indicated at 7, to serve as a guide to the operator in making his adjustment.

Mounted between lugs 8 on top of the housing is a dog having a vertically toothed face 9 to engage the teeth 6 of the ratchet element 5, and having a body 10. A pin 11 is pivoted between the lugs 8 on the housing, and passes through a hole in the dog. The outer end of the pin carries a compression spring 12, which is adjusted in tension by a nut 14 on the end of the pin, and bears against the body of the dog. This pin and spring force the dog into engagement with the ratchet.

A cam lever 15 pivoted on the pin 11, lies so that its cam portion 16 will engage and force the dog body outwardly along the pin against the spring, thereby lifting its face away from the ratchet, when this is desired.

Mounted rotatably on the upper tip of the screw, is a head 17, having a pivot stud 18 for the operating lever, and a hole 19 through its body for the operating lug of the lever. I have shown the stud and the hole in duplicate, in case it might be desired to mount two operating levers on the head.

The operating lever 20, pivoted on the said stud 18, has a lug 20$^a$, which is of a size which will pass down through the hole 19 when the lever is in place. The lug 20$^a$ is heavy, but not as wide as the space between the teeth 4 on the screw head.

In operating the screw down, which has now been described in the example chosen for illustration of my invention, the operator will cam out the dog, for the more substantial adjustment, by means of the lever 15. In finer adjustments he permits the dog to engage the ratchet face on the screw head. In applying the screw, he lifts the lever and swings the lever supporting head around sufficiently to give him a convenient operating angle, and then drops the lever so that its lug lies between the teeth of the screw head, and taps the side face of the selected tooth by manipulation of the lever, giving it a blow in the nature of a hammer-blow. Such a blow will dislodge the dog from the ratchet and permit the screw to rotate one notch of the ratchet, or more depending upon the nature of the blow.

The operator can watch the calibrations on the screw head, with relation to a convenient mark, and can very easily give the desired micrometer adjustment to the screw.

Having thus described my invention, what I claim as new and desire to secure by Letters Patent, is:—

1. The combination with the screw of a rolling mill or the like, a head for the screw having means for preventing its movement under stresses imparted by the mill and a freely rotating member mounted on the axis of the head, and projections on the head and the member, arranged to contact with each other, but having a desired free play to permit of imparting a hammer-like blow to the head.

2. The combination with the screw of a rolling mill or the like, a head for the screw, a freely rotating member mounted on the axis of the head, and projections on the head and the member, arranged to contact with each other, but having a desired free play to permit of imparting a hammer-like blow to the head, and a ratchet and spring dog device for holding the screw in adjusted positions.

3. The combination with the screw of a rolling mill or the like, a head for the screw, a freely rotating member mounted on the axis of the head, and projections on the head and the member, arranged to contact with each other, but having a desired free play to permit of imparting a hammer-like blow to the head, a multiple toothed spring dog, and a ratchet formed on the head for engagement by said dog, for the purpose of holding the screw head in adjusted positions.

4. In combination with the screw of a rolling mill, a head for the screw having means for preventing its movement under stresses imparted by the mill and having its top face formed with spaced teeth, a rotary element mounted above the screw head, and a lever pivoted in said element, a lug on the lever adapted to engage between the teeth of the head but of less width than the space between the teeth, said lever being so supported as to permit its lug to be swung down between the teeth.

5. In combination with the screw of a rolling mill, a head for the screw having its top face formed with spaced teeth, a rotary element mounted above the screw head, and a lever pivoted in said element, a lug on the lever adapted to engage between the teeth of the head but of less width than the space between the teeth, said lever being so supported as to permit its lug to be swung down between the teeth, a ratchet face formed on the screw head, and a multiple toothed spring dog to engage said ratchet face.

6. In combination with the screw of a rolling mill, a head for said screw having means for preventing its movement under stresses imparted by the mill and having its top face formed with spaced teeth, a head rotatably mounted on the screw above the head first mentioned, a lever pivoted in said head, and having a lug thereon, said lever so pivoted as to permit its lug to be swung down between the teeth on the head, and said lug being of less width than the space between the teeth.

7. In combination with the screw of a rolling mill or the like, a head for the screw, a projection from the head for driving the same, a lug for engaging the projection, a lever adjustable about the axis of the screw, and adapted to bring the lug into engagement with the projection, said projection and lug having free play between them in the operating plane, for the purpose described.

8. In combination with the screw of a rolling mill, a head for the screw having means for preventing its movement under stresses imparted by the mill and a lever for revolving the head, a ring with vertical V-shaped teeth thereon, on the head and a spring dog mounted to engage said teeth.

JOHN B. TYTUS.